Nov. 28, 1961 A. E. MAGUIRE 3,010,269
ROTARY MOWER CUTTER ASSEMBLY
Filed March 3, 1958
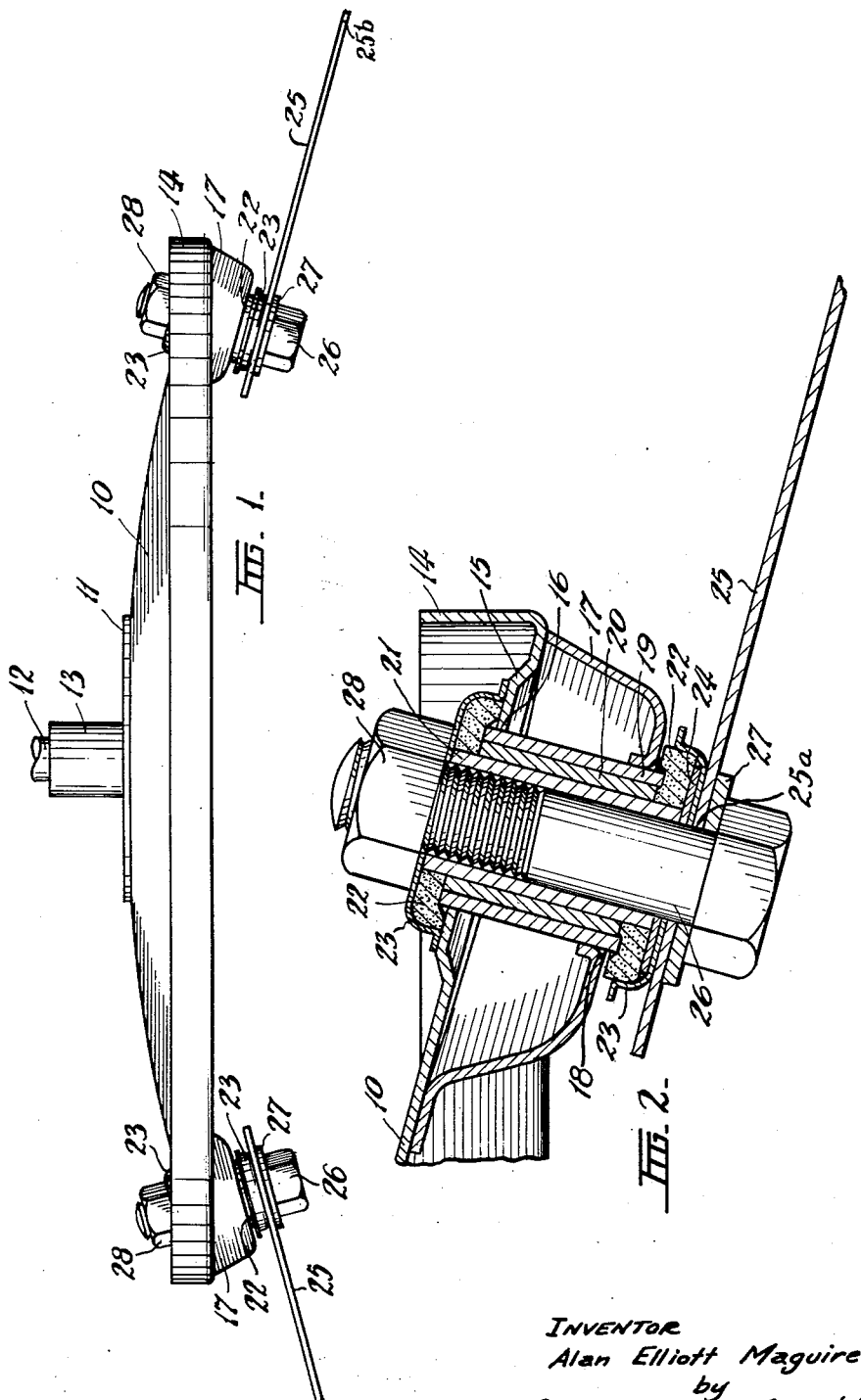
INVENTOR
Alan Elliott Maguire
by
Des Jardins, Robinson, Tuttle & Schenk
HIS ATTORNEYS 3,010,269
ROTARY MOWER CUTTER ASSEMBLY
Alan Elliott Maguire, 73 Windmill St., Tarragindi,
Brisbane, Queensland, Australia
Filed Mar. 3, 1958, Ser. No. 718,907
5 Claims. (Cl. 56—295)

This invention relates to a rotary mower cutter assembly.

A well-known type of rotary mower consists basically of a frame, including a shield, mounted on wheels and to which a rearwardly extending handle is connected, a motor mounted on the frame driving a rotor below the shield and having two or more radially extending blades, pivotally bolted thereto, the shield providing a guard over and about the blades. The blades are bolted near to the periphery of the rotor, which is ordinarily circular in plan, its middle part dished upwardly so that the blades are capable of retracting pivotally on encountering a solid obstruction, and also so that they may be readily replaced. The heads of the bolts holding the blades extend below the blades, which lie in a plane perpendicular to the axis of the rotor, these bolt heads, therefore, extending below the level at which grass is cut by the spinning blades of the mower.

Now, the grass cutting action of the blades of such a rotary mower is effected entirely by their outermost parts, owing to their very rapid rotation, and not by the whole of the leading edges, as would be the case, for example, in a relatively slow moving cutter, such as a conventional scythe. Nevertheless, in a conventional rotary mower, the whole undersurfaces of the blades are swept across the tops of cut grass, and the heads of the bolts securing the blades are spun rapidly through the grass. This is clearly evidenced by the degree of polishing and wear of the undersides of the blades and of the bolt heads which is apparent after such a mower has been in use for some time. Moreover, the friction which results in this polishing and wear has a notable effect in decreasing the efficiency and power of a rotary mower.

The present invention has been devised to overcome the said present disadvantages by providing such improvements in a rotary mower that this excessive drag of friction will be eliminated, and the mower will consequently operate with greatly increased efficiency.

With the foregoing and other objects in view, the invention resides broadly in a rotary mower cutter assembly including a rotor adapted to be secured to a rotary mower drive shaft, blades, and pivots connecting the blades pivotally to the rotor, the parts being so made and arranged that the blades are adapted to be swung centrifugally outwards of the rotor, their outermost parts then being below the level of their pivotal attachments to the rotor. Other features of the invention will become apparent from the following description.

In the drawings:

FIG. 1 is a side elevational view of a rotary mower cutter assembly according to the invention, and FIG. 2 is a sectional view, to enlarged scale, of the pivotal connection of one of the blades to the rotor.

The assembly includes a sheet metal rotor 10, circular in plan view, and with a flat circular central part strengthened by a reinforcing disc 11 welded thereto. In usual manner, a central aperture is formed through the rotor to receive the threaded lower end of the drive shaft 12 of a conventional rotary mower, this shaft being provided with a collar 13 which seats on the top of the reinforcing disc 11, the lower end of the shaft 12 being engaged by a nut (not shown) to secure the rotor in place.

The rotor 10 is dished, curving downwardly and outwardly from its central flat portion to an upwardly extending integrally formed peripheral flange 14.

At diametrically opposed positions on the rotor, near to its periphery, there are pressed upwardly two bosses 15 about co-axial holes 16 through the rotor.

Below each of the bosses 15 there is welded to the undersurface of the rotor 10 a sheet metal blister 17, in which an aperture is formed at 18, co-axially with the boss 15 and the aperture 16. Owing to the dished construction of the rotor, the common axis of these apertures is at an angle to the axis of the rotor. A metal tube 19 is secured in these apertures, and within this tube there is secured a bush 20, the tube 19 and bush 20 both extending above the boss 15 and below the blister 17.

Fitted rotatably in the bush 20 is a sleeve 21, which extends somewhat above and below the tube 19 and bush 20, and has a packing washer 22 made, for example, of felt, fitted about each end. Each packing washer 22 is enclosed within a dished and centrally apertured sheet metal packing holder 23, a metal washer 24 being first fitted within the lower holder 23.

The assembly includes two similar blades 25, each consisting of a rectangular hardened sheet metal element with an aperture 25a formed near to one end. Each blade is secured pivotally in place by a pivot bolt 26 passed through a washer 27, through the aperture in the blade, through the central aperture of the lower packing holder 23 and its washer 24, through the sleeve 21 and the central aperture of the upper packing holder 23, and finally engaged by a nut 28. The two packing washers 23 are compressed onto the ends of the tube 19 and bush 20 and so act to prevent the ingress of dust or grit between the bush 20 and the sleeve 21.

The parts of the assembly are so made and arranged that the downward and outward inclination of the blades 25 when in normal operative position is such that the outermost portions 25b are disposed well below the level of the heads of the bolts 26 and, of course, any other parts of the rotor. Moreover, owing to the spacing of the blades 25 below the rotor 10, each of the blades may be freely swung through a complete circle about its pivot bolt 26, without contacting the underside of the rotor.

As the depth of the assembly as described and illustrated, from the top of the rotor to the outermost parts of the blades 25 when in operative or extended position is greater than that of a conventional assembly, it will be found necessary, when applying the assembly to a conventional rotary mower, to make an appropriate adjustment, by raising the frame of the mower relative to its wheels.

In use, when the motor of the mower is operated, the blades 25 are thrown centrifugally to outermost position. As the mower is advanced over grass to be cut, the resistance offered by the grass causes the blades 25 to be inclined somewhat to radial, and as a result, in each blade, during cutting, the leading outer corner portion of the blade, which effects the cutting of the grass, is the lowermost part, the other outer corner of the blade being at a higher level, and consequently no part of the blade other than that which does the cutting is moved over and in contact with the cut grass. The inclination of the blades from side to side, as well as from end to end, results in normal wear of the blades bringing the cutting parts of the blades to bevelled form, increasing their efficiency. The blades are free, of course, to retract if they should encounter hard obstacles during mowing operations. Owing to the inclined setting of the blades, normal wear of the outermost parts of the blades fairly soon causes them to be bevelled to cutting edges which somewhat increases their efficiency. Owing to the elimination of friction caused by contact by the pivot bolts and/or other parts of the assembly and the grass being cut, or the earth, in the case of uneven or boggy ground, the motor of the mower will operate with far greater efficiency than is the case with conventional mowers; and, at the same time, as the grass is not acted upon by the rapidly rotating pivot bolt heads, or other noncutting parts of the assembly, the grass will be particularly well-mown.

If on any occasion it is required to cut grass, weeds or the like down to, or very near to, ground level, this may be done with a cutter assembly according to the invention.

A further advantage is that, as the heads of the pivot bolts 26 are not liable to undue wear, making them difficult to engage with a spanner or wrench, the replacement of blades as and when required may be easily effected at any time.

When the mower is not in use, the blades, as a safety precaution, may be moved pivotally inwards to full extent, and if the mower motor is then operated, the blades, inset from the periphery of the rotor, are quite ineffective, and they can be clamped in that inset position so as not to be thrown centrifugally outwards without first being loosened.

Although rotary mower cutter assemblies as herein described and illustrated will be found to be very effective in achieving the objects for which the invention has been devised, it will be understood, of course, that this particular embodiment of the invention may be subject to many modifications of constructional detail and design without departing from the scope of the invention, as defined by the appended claims.

I claim:

1. A rotary mower assembly comprising a dished and centrally apertured circular rotor with an upstanding flange about its periphery, a pair of diametrically opposed projections extending downwardly from the rotor near to its periphery, a bearing through each of the projections, the axes of the bearings converging downwardly, a sleeve rotatably mounted in each bearing, a packing washer at each end of the sleeve and bearing, two flat cutter blades, each with an aperture near to one end, and a pivot bolt passing through the aperture of each blade, through the sleeve and engaged by a nut, the downward convergence of the bearings being such that the outer ends of the blades, when the blades are in outwardly extended position, are below the heads of the pivot bolts, the projections being such that the blades may be rotated about their pivots without contacting the rotor for setting back said blades inwardly from the periphery of the rotor to inoperative position.

2. A rotary mower cutter assembly comprising a dished rotor, drive means operatively associated with said rotor for driving said rotor, said rotor having an axis of rotation, a plurality of pivots symmetrically mounted on said rotor near the periphery thereof and inclined downwardly towards said axis of rotation of said rotor, each of said pivots having an axis lying in a radial plane extending through the axis of said rotor, and a plurality of cutter members each having a cutting end portion and an opposed end portion connected to one of said pivots for complete rotation relative thereto at a location below and spaced from said rotor, said cutting end portion being disposed entirely below said location when extended radially outwardly therefrom and disposed entirely above said location when extended radially inwardly therefrom.

3. The combination of claim 2 wherein said rotor is secured to a drive shaft and the axis of each of said pivots lying in a radial plane extending through the axis of said shaft.

4. The combination of claim 2 wherein each of said cutter members comprises a plane rectangular cutting blade mounted near one end thereof at right angles to its respective pivot.

5. The combination of claim 2 wherein the rotor is frusto-conical.

References Cited in the file of this patent

UNITED STATES PATENTS

| | | |
|---|---|---|
| 1,805,927 | Sharp | May 19, 1931 |
| 2,553,731 | Travis | May 22, 1951 |
| 2,654,986 | Gold | Oct. 13, 1953 |
| 2,737,772 | Jacobsen | Mar. 13, 1956 |
| 2,740,249 | Stearns | Apr. 3, 1956 |
| 2,787,881 | McDaniel | Apr. 9, 1957 |
| 2,792,770 | Ober | May 21, 1957 |
| 2,793,484 | McNeill et al. | May 28, 1957 |
| 2,872,770 | Murphy et al. | Feb. 10, 1959 |